Figure 1:
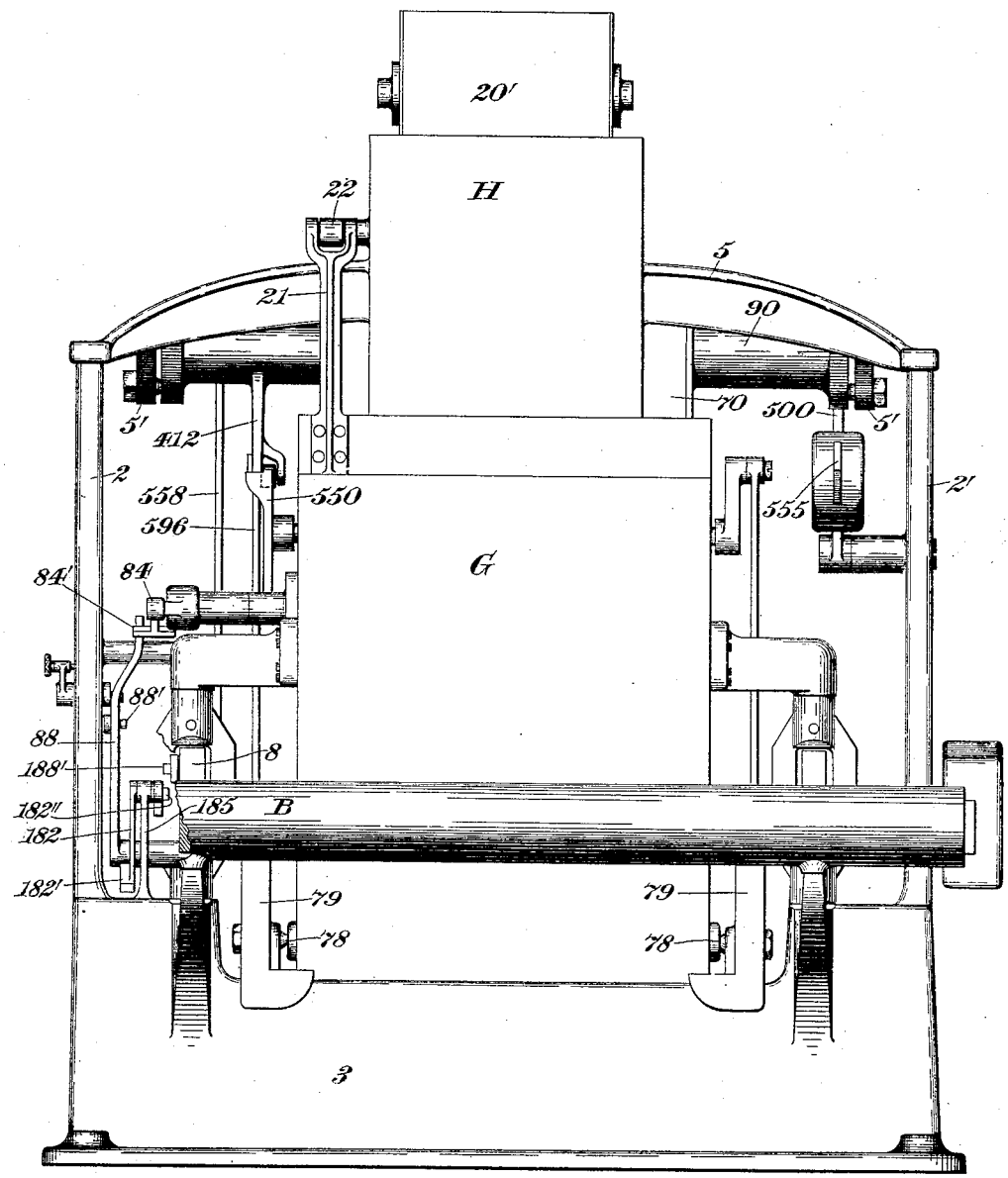

(No Model.)  5 Sheets—Sheet 1.

F. H. RICHARDS.
AUTOMATIC WEIGHING MACHINE.

No. 572,067. Patented Nov. 24, 1896.

Witnesses:
Chas. D. King.
Fred. J. Dole.

Inventor:
F. H. Richards (No Model.)  5 Sheets—Sheet 3.

F. H. RICHARDS.
AUTOMATIC WEIGHING MACHINE.

No. 572,067.  Patented Nov. 24, 1896.

Witnesses:
Chas. D. King.
Fred. J. Dole.

Inventor:
F. H. Richards.

(No Model.)
5 Sheets—Sheet 5.

F. H. RICHARDS.
AUTOMATIC WEIGHING MACHINE.

No. 572,067.　　　　　　　　　　Patented Nov. 24, 1896.

Witnesses:　　　　　　　　　　Inventor:
Chas. D. King.
Fred. J. Dole.　　　　　　　　　　F. H. Richards.

UNITED STATES PATENT OFFICE.

FRANCIS H. RICHARDS, OF HARTFORD, CONNECTICUT.

AUTOMATIC WEIGHING-MACHINE.

SPECIFICATION forming part of Letters Patent No. 572,067, dated November 24, 1896.

Application filed July 9, 1896. Serial No. 598,555. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Automatic Weighing-Machines, of which the following is a specification.

This invention relates to weighing-machines for automatically weighing predetermined quantities of material; and it has for its main object to provide an apparatus of this type especially adapted for weighing a large quantity of material at each load—as, for example, in weighing from grain-elevators into cars, where it is desirable to fill a car at each discharge of a load from the weighing-machine.

In weighing-machines as heretofore constructed it has been the practice, in all the types of this class of apparatus with which I am familiar, to make the load in a suitable receiver or bucket by continuous or successive additions of material, the usual practice being to deliver the major portion of the load into the receiver in a relatively short space of time and to then supply the remaining portion in the form of a slowly-running drip-stream of small volume, which will carry the bucket to the poising-line and overpoise the same without impairing the accuracy of the load by the impact and momentum of the material, as would be the case if the whole load were to be supplied by a stream of large size flowing at a relatively rapid rate of speed.

Owing to the extreme sensitiveness of action of a weighing-machine of very large size it has been found impracticable to employ automatic weighing mechanisms in which the exact load is made up by the delivery of successive supplies of material to the load-receiver or bucket, as the momentum of the bucket and the other parts of the poising portion of the weighing mechanism is sufficient, even when a very small drip-stream is employed, to carry the bucket and the beam mechanism down and overpoise the same before a true load has been made up. I have found, however, that large loads of true weight may be made up in an automatic weighing mechanism by first delivering into the bucket an overload considerably in excess of the proper amount to be weighed by the machine and then reducing the weight of the load by removing the excess or surplus therefrom, and hence it is the main object of my present invention to provide an automatic weighing-machine having load-supplying means adapted to deliver material thereto and load-reducing means operative during the weighing of a load by the machine, and I consider as within the scope of my invention any automatic weighing-machine in which there is provided means for reducing the surplus after overloading the receiver or bucket and before the completed load is finally discharged.

Figure 2:
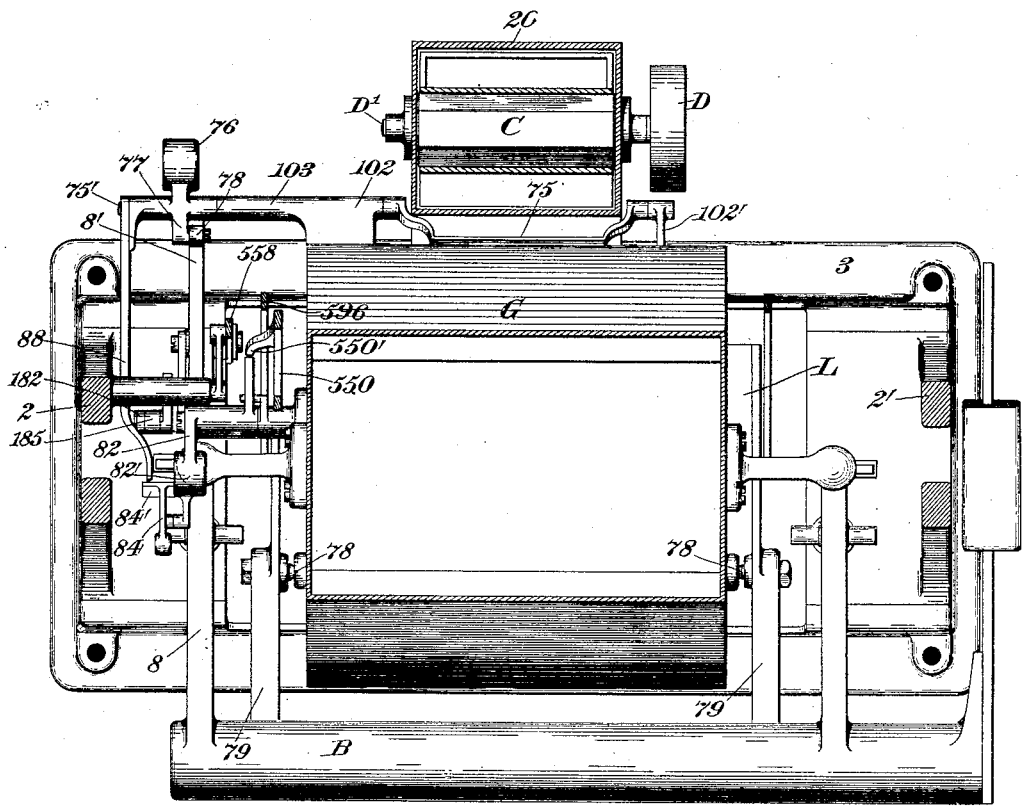
Figure 3:
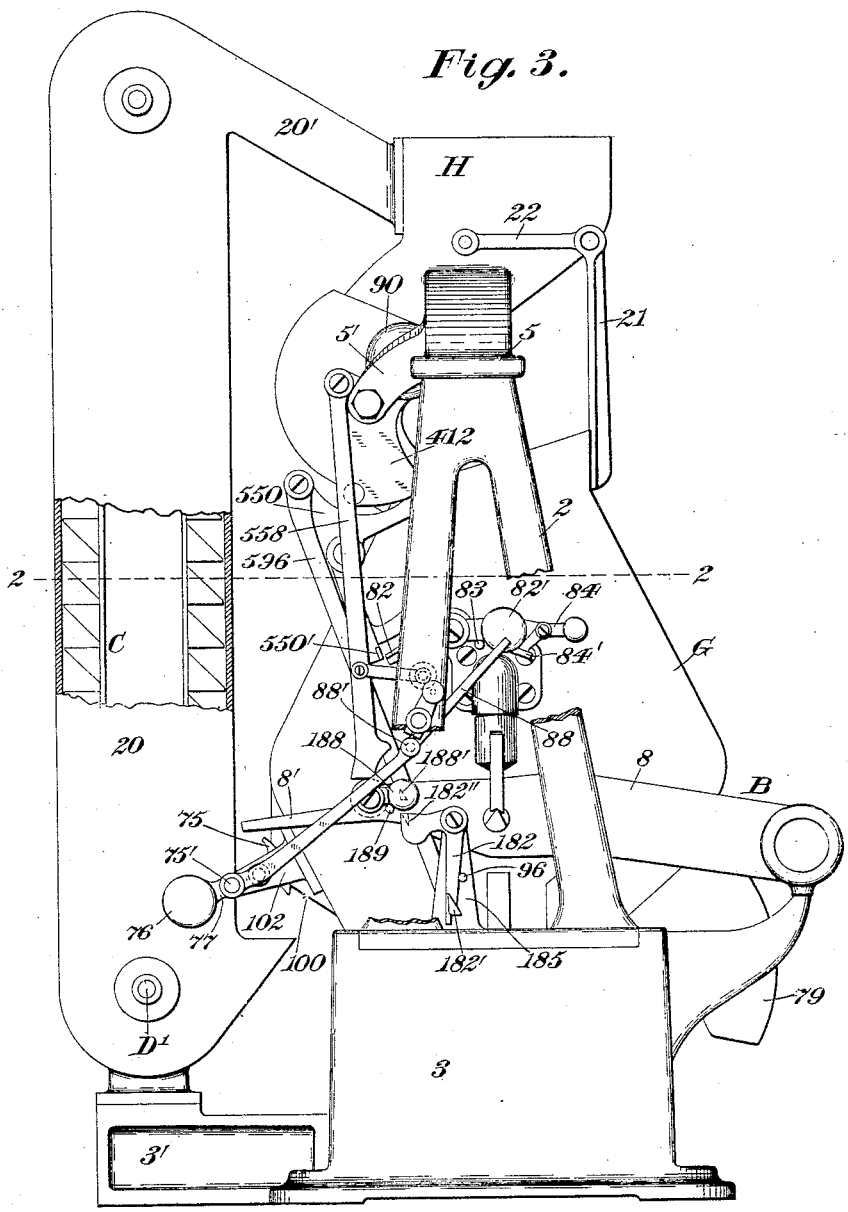
Figure 4:
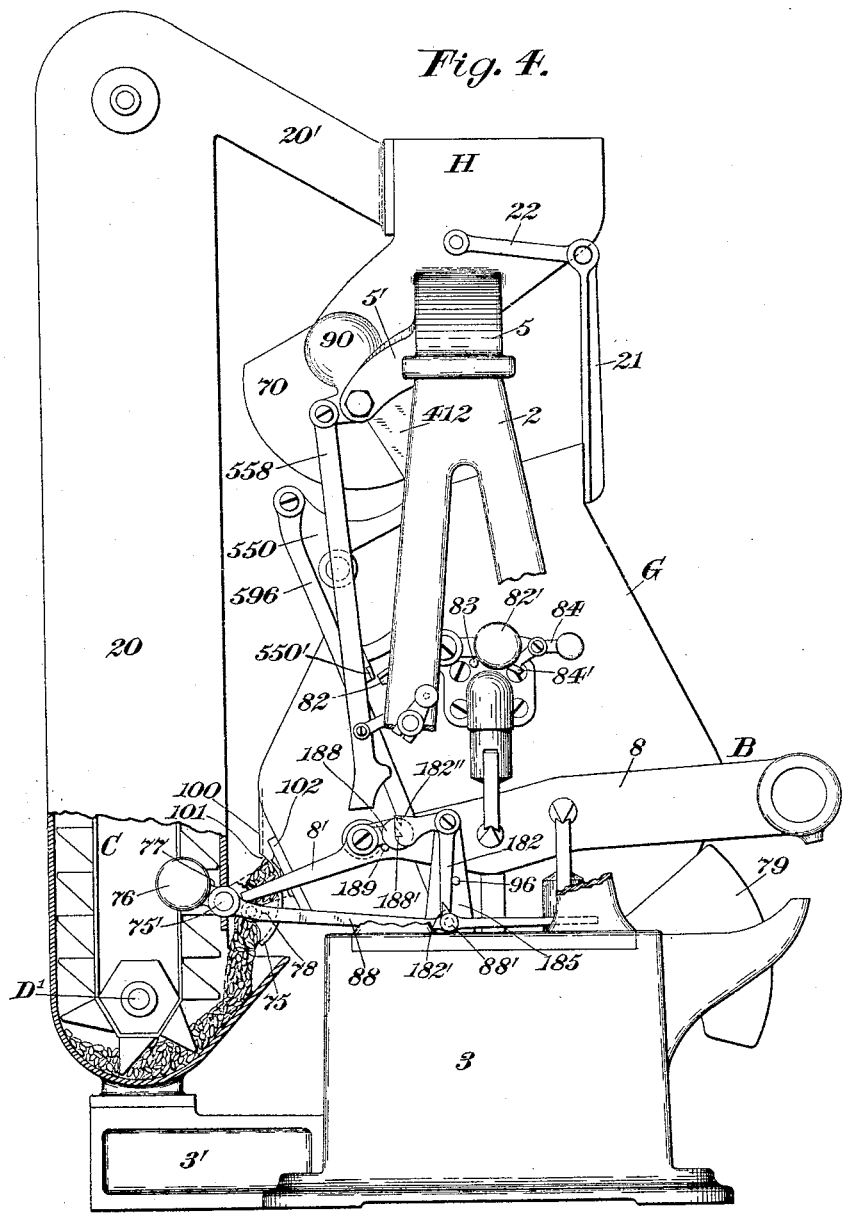
Figure 5:
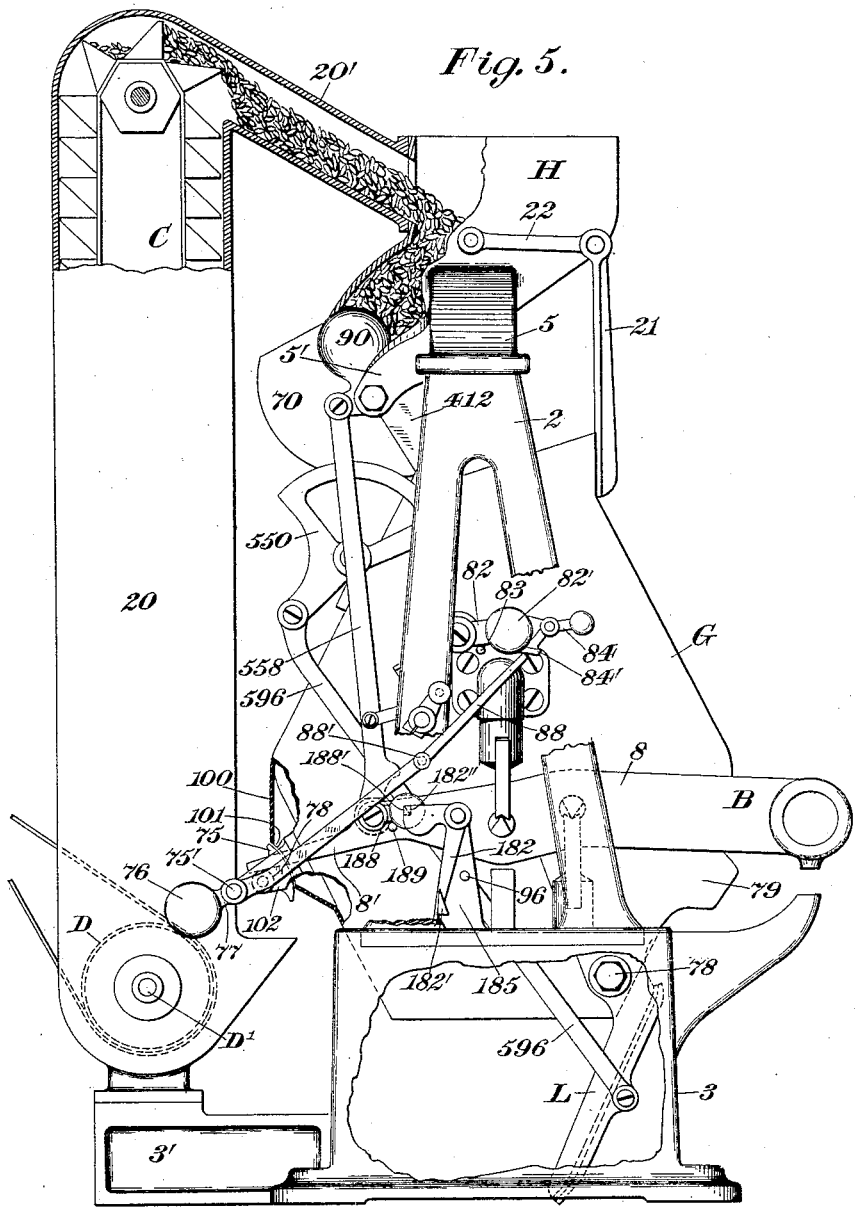

In the drawings accompanying and forming part of this specification, Figure 1 is a front elevation of a weighing-machine constructed in accordance with my present invention, parts of the mechanism being broken away to illustrate more clearly the construction. Fig. 2 is a horizontal section of the same, the section being taken in line 2 2, Fig. 3. Figs. 3 to 5, inclusive, are corresponding end elevations of the same with parts removed and illustrate successive steps in the operation of loading the bucket and discharging the material therefrom.

Similar characters designate like parts in all the figures of the drawings.

Any suitable framework may be employed for supporting the operative parts of my improved weighing-machine. In the present instance I have shown a supporting-base 3, having secured thereto a pair of uprights or side frames 2 and 2' and a top plate 5, while at the rear of the main base 3 I have illustrated an auxiliary support or base-piece 3', on which is mounted a casing, such as 20, connected at its upper end by an inclined chute 20' with the usual supply spout or chute H of the weighing mechanism, this supply-spout being carried in the usual manner by the top plate 5.

My present invention may be applied to weighing-machines of various types, but I prefer to employ the same in connection with a weighing mechanism of the "single-chambered" class, substantially similar to that shown and described in Patent No. 548,840, granted to me October 29, 1895.

The beam mechanism is designated in a general way by B, and may be supported by knife-edges upon the base 3 in a well-known manner, while the load-receiver or bucket, which is designated in a general way by G, is correspondingly carried by the poising portion of the scale-beam 8.

For the purpose of guiding the bucket in its movements I prefer to secure thereto a guide-arm 21, pivotally connected, as by means of a link 22, with a suitable fixed portion of the machine—as, for example, the chute H.

The bucket G has hinged to the lower end thereof, so as to control the discharge of the load therefrom, a closer of well-known construction, this being pivoted to the bucket at 78 and counterweighted at 79, so as to be held normally shut.

The valve for controlling the supply of material to the bucket may be of any suitable type, but is preferably similar to that shown and described in Patent No. 535,727, granted to me March 12, 1895. This valve is designated in a general way by 70, and preferably is pivotally mounted in hangers 5', depending from the top plate 5, this valve being also preferably balanced, as by means of a balance-weight 90, so as to have no tendency, normally, to either open or close.

For the purpose of actuating the valve 70 to close the same I may make use of a counterweighted lever 555, pivotally supported on the upright 2', and having at its free end an antifriction-roll (not shown) coöperating with the face of a cam 500, depending from the valve 70.

In order to prevent the discharge of the load from the bucket while the valve is open, and in order to maintain the valve closed while the closer is open, I prefer to employ, in connection with my present invention, interlocking mechanism substantially similar to that described in my patent first hereinbefore referred to. The main valve 70 therefore has secured thereto for movement in unison therewith a stop or closer-opening-movement limiter 412, while the closer is pivotally connected to a thrust-rod 596, pivoted in turn at its upper end to a rocker 550, mounted for oscillation on one side of the bucket near the receiving end thereof, this rocker being positioned so as to coöperate with the stop 412 and forming a valve-opening-movement limiter for preventing the opening of the main valve until and unless the closer L is shut.

The valve-opening actuator may be of any preferred form, but in the present case the beam mechanism will operate the valve 70 on the shutting of the closer L, after a bucket-load has been discharged and the bucket and the beam mechanism have risen to the position shown in Fig. 5. The movement of this beam mechanism is preferably transferred to the valve by means of a thrust-rod 558, pivoted at its upper end to a suitable portion of the valve and having its lower end in position to block the return of the beam mechanism to its normal position until the rocker 550 is withdrawn from engagement with the face of the stop 412 and in position also to be operated by the beam mechanism at the moment of such withdrawal and to thereby force the main valve open.

I may employ any suitable form of latch for engaging a detent, such as 550', on the rocker 550, for holding the closer shut while the bucket is being loaded, and in the present instance this latch is illustrated at 82, and is of the usual counterweighted type, it being limited in its latching movement by means of a suitable stop—as, for instance, that shown at 83. In the present case this latch also carries at one end a by-pass stop 84, the purpose of which will be hereinafter pointed out.

As the main stream is usually advantageously controlled by means of valve mechanism—such, for instance, as that hereinbefore described—so I find it preferable to provide, for reducing the overload supplied to the bucket by the main valve 70, valve mechanism controlling a suitable outlet or load-reducing opening in the bucket. Hence the bucket may have at one side thereof an opening formed, for example, at the end of an extension or spout, such as 100, projecting from the side of said bucket, the opening therefrom (indicated herein by the line 101) being controlled by means of a valve which will cover and uncover said opening at the proper points in the operation of the weighing mechanism. The load-supporting face of the spout is preferably inclined toward the discharge end of the bucket, so that the material will flow freely from the spout through the bucket when the closer is opened.

The valve for regulating the reduction of the overload, and hence of the surplus in the bucket, may be of any suitable type, that illustrated herein at 75 being counterweighted and reciprocatory across the opening 101, said load-reducing valve preferably being pivoted for oscillation between arms or brackets 102 and 102', extending from the bucket G. The valve 75 is supported in journals in the ends of these arms by means of trunnions, the trunnion supported by the bracket 102 being extended through a long bearing 103 in the arm 102 and having rigidly secured thereon a counterweight 76. This counterweight is preferably formed at the rear end of an arm 77, carrying at the inner end thereof an antifriction-roll 78, for a purpose to be hereinafter stated. At the extreme left-hand end of the valve-shaft 75' a forwardly-extending fixed arm is illustrated at 88, and this constitutes, in the present case, a tripper for releasing the bucket-latch 82 from engagement with the detent 550' on the rocker 550 when the surplus has been removed from the bucket during the weighing operation and the overload reduced to an exact load. The tripper is of such length that its outer end swings in the path of the by-pass stop 84 on the bucket-latch and passes by the stop 84' on said by-pass when the load-reducing valve 75 is opened and the tripper descends from the position shown in Fig. 3, it being obvious that when the tripper swings upward it will strike the stop 84' and will carry said stop into engagement with the counterweight 82' of the bucket-latch 82, when the by-pass stop 84 will become a fixed abutment on the bucket-latch and the latch-tripper will be effective to release said latch.

For the purpose of actuating the load-reducing valve to open the same the beam 8 preferably has its poising portion extended to form an actuating-arm 8', adapted to oscillate in the path of the antifriction-roll 78, secured to the valve-shaft 75', and hence it will be obvious that on the descent of the bucket and the beam mechanism this actuating-arm will carry the valve 75 downward and will uncover the opening 101 in the side of the bucket, at the same time causing the bucket-latch tripper to descend until the latter has reached the limit of its downward movement.

As it is necessary to maintain the load-reducing valve in its open position for a considerable period while that portion of the material in the bucket in excess of the true load is being discharged therefrom I prefer to employ a valve-latch, such as that shown at 182, for engaging the tripper 88 and holding the same until the beam-arm 8' has risen to a determined point. This valve-latch is preferably in the form of a counterweighted lever pivoted on an upright 185, forming part of the framework and having a stop 96 for limiting the latching movement of the lever 182. This valve-latch may also have thereon a pair of stops, one of which, 182', on the outside thereof, will form a detent for the bucket-latch tripper 88, while the other, 182", on the inside thereof, will constitute a releasing-stop adapted to be engaged by a valve-latch tripper movable with the weighing mechanism. This valve-latch tripper (designated herein by 188) is preferably a counterweighted lever pivoted on the beam-arm 8' and is in the nature of a by-pass actuator effective on the upward stroke of the scale-beam, it being limited in its downward movement by means of a stop 189 on the arm 8' and it having also a stop member 188', adapted to pass by the stop 182" of the valve-latch when the arm 8' is descending and to engage said stop 182" and release the valve-latch at a predetermined point in the ascent of the bucket and the beam mechanism.

The operation of an automatic weighing-machine constructed in accordance with my present invention as hereinbefore set forth is as follows: It being understood that material will be continuously supplied to the valve 70 by the load-supplying or overloading means—viz., the chute H—a stream will be delivered into the bucket G until the latter is overloaded and descends below the poising-line, whereupon the main valve 70 will be closed by the valve-closing actuator 555 acting upon the cam 500. As the bucket descends and passes the poising-line it is overpoised by the overload therein and the beam-arm 8' is carried into engagement with the antifriction-roll 78, which beam-arm, descending to the limit of its downward movement, carries the valve 75 from the position shown in Fig. 3 to that represented in Fig. 4, the arm 88 passing the stop 84' on the by-pass 84 and carrying with it the load-reducing valve until the stop 88' on the bucket-latch tripper passes down the sloping face of the stop 182' and is latched beneath the same. It should be understood here that the stop 188' on the valve-latch tripper 188 will come into contact with the upper face of the stop 182" on the valve-latch and will pass by the same to the position also shown in Fig. 4. As the surplus flows out of the bucket from the upper edge of the valve 75 it will pass into the lower or receiving end of the casing 20, in the vertical portion of which a conveyer C is supported for operation. This conveyer may be of any suitable construction and will be driven from a proper source of power—as, for example, by means of a band-wheel D, carried at the end of a driving-shaft D'. This conveyer is in the nature of an elevator for raising the discharged surplus and carrying this material back into the main chute H by way of the delivery-chute 20', the apparatus constituting reconveying means for restoring the surplus to the bucket, this surplus being returned to the load-receiver in the present case on the making up of a new load. After the major portion of the surplus has been discharged it will be obvious that the poising mechanism will rise at a predetermined point in the ascent of the bucket and that the stop 188' on the valve-latch tripper will engage by its sloping face the corresponding slanting face of the stop 182" on the valve-latch and will actuate the same to withdraw the stop 182' from engagement with the stop 88' on the bucket-latch tripper 88, whereupon the arm 88 will swing upward and the valve 75 will be closed by the force of its counterweight. When the end of the tripper 88 reaches the stop 84', the superior force of the counterweight 76 will be effective to raise the forward end of the bucket-latch slightly in opposition to the force of the counterweight 82' thereof, and the bucket-latch will be disengaged immediately from the detent 550' of the rocker 550, whereupon the rocker will swing to the position shown in Fig. 5 and the closer L will open to discharge the load from the bucket. The rocker 550 will now be in position to prevent the reopening of the main valve 70 until the closer is shut again, and this will not take place until all of the material, including that in the outlet-spout 100, has been discharged from the bucket G. It will be obvious that the thrust-rod 558 will now be a rigid abutment and will prevent the return of the scale-beam from the position shown in Fig. 5 to that illustrated in Fig. 3 until the closer L is shut; but as soon as the closer is shut the rocker 550 will be withdrawn from engagement with the stop 412 of the main valve, and thereupon the counterweighted beam mechanism will operate to reopen the main valve for the making up of a new load. Immediately upon the ascent of the bucket to its uppermost position the valve-latch tripper 188 will pass by the stop 182" of the valve-latch and will rise to the position shown in Fig. 3.

The movement of the poising portion of the beam, and also of the bucket G on the ascent thereof, is practically continuous, as the same will rise slowly from their lowermost positions until they reach substantially the poising-line of the weighing mechanism, when the reducing-valve will be unlatched and will close the reducing-opening in the bucket, whereupon the bucket-latch will be released and the load discharged, when the bucket will continue to rise at a very greatly accelerated rate of movement.

It will be seen from the foregoing that in addition to embodying load-reducing means operative during the weighing of a load my invention contemplates particularly the provision of load-reducing means operative on the poising of the weighing mechanism while the load is being weighed in the bucket, and especially the provision of means for uncovering a load-reducing opening in a load-receiver while the load is being weighed, to thereby reduce an overload to a true load during a period when no extraneous force, due to the impact and momentum of a stream delivered onto the charge already in the bucket, is acting upon the bucket mechanism to impair the accuracy of the weighing operation. The overpoising of the bucket is effected in the first instance by suitable overloading means, as hereinbefore stated, and the reduction of the overload by proper surplus discharging or surplus-reducing means, such as hereinbefore described, for subtracting the surplus from said overload on the overpoising of the load-receiver.

As the bucket is not discharged until it has risen from the overpoising position to the poising position, it will be equally obvious that my invention also contemplates, broadly, the employment of overloading means, load-reducing means, and load-discharging means operative in that order, the latter preferably being operative on the ascent of the bucket and at the poising thereof.

By means of my present invention I am enabled to weigh, in automatic machines of this class, exact loads in buckets or load-receivers having very great capacities as compared with those employed in apparatus of this type heretofore known in the art; for, owing to the fact that no extraneous force can affect the weighing operation after the supply has been shut off at the load-supplying means, it will be apparent that there is no load-vitiating factor present during the reduction of the overload to a true load.

Having described my invention, I claim—

1. The combination with an automatic weighing mechanism and with load-supplying means therefor, of load-reducing means operative during the weighing of a load.

2. The combination with an automatic weighing mechanism and with load-supplying means therefor, of load-reducing means operative during the weighing of a load on the overpoising of said mechanism.

3. The combination with an automatic weighing mechanism, of load-supplying means and load-reducing means alternately operative during the weighing of a load.

4. In an automatic weighing-machine, the combination with load-supplying means; of a load-receiver having a load-reducing opening; and means for uncovering said opening during the weighing of a load.

5. In an automatic weighing-machine, the combination with load-supplying means; of a load-receiver; and load-reducing means carried by the load-receiver and operative during the weighing of a load.

6. In an automatic weighing-machine, the combination with load-supplying means; of a load-receiver; and load-reducing means carried by, and movable relatively to, the load-receiver and operative during the weighing of a load.

7. In an automatic weighing-machine, the combination with load-supplying means; of a load-receiver; and reciprocatory load-reducing means carried by the load-receiver and operative during the weighing of a load.

8. The combination with weighing mechanism, of means for supplying an overload of material to the weighing mechanism; and a load-reducing device operable for reducing the overload by discharging a portion thereof to thereby bring the loaded weighing mechanism to a true poise.

9. In an automatic weighing-machine, the combination with a reciprocatory load-receiver; of overloading means for overpoising said load-receiver; and load-reducing means operative during the weighing of a load.

10. In an automatic weighing-machine, the combination with a reciprocatory load-receiver; of overloading means for overpoising said load-receiver; and surplus-discharging means operative during the weighing of a load for subtracting the surplus from the overload.

11. In an automatic weighing-machine, the combination with a bucket, of supplementary valve mechanism for discharging a part of the bucket-load; and main load-discharging means operable on the ascent of the bucket.

12. In an automatic weighing-machine, the combination with a bucket; of supplementary mechanism for discharging a part of the bucket-load; and main load-discharging means operative upon the poising of the bucket on the ascent of the latter from an overpoising position.

13. In an automatic weighing-machine, the combination with a bucket and with a closer therefor, of closer-releasing means automatically operative on the ascent of the bucket.

14. In an automatic weighing-machine, the combination with a bucket; of the following instrumentalities operative in the order named—viz., overloading means, load-reducing means, and load-discharging means.

15. In an automatic weighing-machine, the combination with a bucket; of overloading means for overpoising said bucket; surplus-reducing means operative during the weighing of a load; and surplus-reconveying means for restoring the surplus to the bucket.

16. In an automatic weighing-machine, the combination with weighing mechanism embodying a bucket; of the following instrumentalities operative in the order named—viz., overloading means, overload-reducing means, load-discharging means, and overload-reconveying means for restoring the overload to the bucket on the make-up of a new load.

17. In an automatic weighing-machine, the combination with a bucket, beam mechanism, and load-supplying means; of beam-operated load-reducing means carried by the bucket and operative during the weighing of a load.

18. The combination with a load-receiver, of overloading and load-reducing mechanisms operative in the order named and effective, respectively, for causing the descent and ascent of said load-receiver below and to the poising-line during the weighing of a load; and means for preventing the discharge of the load-receiver during said descending movement thereof.

19. In an automatic weighing-machine, the combination with a bucket, beam mechanism, and load-supplying means; of reactive, beam-operated load-reducing means carried by the bucket and operative during the weighing of a load.

20. In an automatic weighing-machine, the combination with a bucket, beam mechanism, and load-supplying means; of counterweighted, beam-operated load-reducing means carried by the bucket and operative during the weighing of a load.

21. In an automatic weighing-machine, the combination with a bucket having a load-reducing opening and with beam mechanism and load-supplying means; of a beam-operated load-reducing valve operative for uncovering said opening during the weighing of a load.

22. In an automatic weighing-machine, the combination with a bucket having a load-reducing opening and with beam mechanism and load-supplying means; of a load-reducing valve operative for uncovering said opening during the weighing of a load; and a valve-latch for holding said valve open.

23. In an automatic weighing-machine, the combination with a bucket having a load-reducing opening and with beam mechanism and load-supplying means; of a load-reducing valve operative for uncovering said opening during the weighing of a load; a valve-latch for holding said valve open; and a valve-latch tripper operative on the ascent of the bucket.

24. In an automatic weighing-machine, the combination with a bucket having a load-reducing opening and with a bucket-latch and beam mechanism; of overloading means; and a latch-tripping load-reducing valve operative for uncovering said opening during the weighing of a load and for releasing the bucket-latch on the ascent of the bucket.

25. In an automatic weighing-machine, the combination with a bucket having a load-reducing opening and with a bucket-latch and beam mechanism; of overloading means; a latch-tripping load-reducing valve operative for uncovering said opening during the ascent of a load and for releasing the bucket-latch on the ascent of the bucket; a valve-latch for holding said valve open; and a valve-latch tripper operable on the ascent of the bucket.

26. In an automatic weighing-machine, the combination with a bucket having a load-reducing opening in one side thereof and between the delivery and discharge ends of the bucket, of means for covering and uncovering said opening.

27. In an automatic weighing-machine, the combination of a bucket having a spout in one side thereof and between the delivery and discharge ends of the bucket and having the load-supporting face of said spout inclined toward the discharge end of the bucket, and means for covering and uncovering said opening.

28. The combination with automatic weighing mechanism and with load-supplying means therefor, of load-reducing means operative during the weighing of a load; and means for receiving material taken from the bucket during such load-reducing action and reconveying it to the bucket for the make-up of a new load.

29. The combination with a supply-hopper and a valve therefor, of weighing mechanism embodying a bucket; load-reducing means operative during the weighing of a load; and means for conveying material withdrawn in reducing said load to said supply-hopper.

30. The combination with a supply-hopper and its regulating-valve, of weighing mechanism embodying a bucket; load-reducing means operative during the weighing of a load; and an elevator for conveying material withdrawn from the bucket during the load-reducing operation to said supply-hopper.

31. The combination with a supply-hopper and a regulating-valve therefor, of weighing mechanism embodying a bucket having a load-reducing opening; a valve for controlling the passage of material from such opening; and means for conveying material withdrawn from the bucket during the reducing operation back to said supply-hopper.

32. The combination with a supply-hopper and a valve therefor, of beam mechanism; a bucket supported thereon; load-reducing means operative with the bucket during the weighing of a load; and means for conveying material withdrawn from the bucket during the reducing operation back to said supply-hopper.

FRANCIS H. RICHARDS.

Witnesses:
FRED. J. DOLE,
HEATH SUTHERLAND.